(12) United States Patent
Ahluwalia et al.

(10) Patent No.: US 8,112,532 B2
(45) Date of Patent: Feb. 7, 2012

(54) SYSTEM AND METHOD FOR TEARING DOWN INDIVIDUAL IP COMMUNICATION SESSIONS IN MULTIPLE IP STACK DEVICES

(75) Inventors: Mankesh S. Ahluwalia, Schaumburg, IL (US); Narothum Saxena, Hoffman Estates, IL (US); Michael Irizarry, Algonquin, IL (US); George Pitsoulakis, Orland Park, IL (US)

(73) Assignee: United States Cellular Corporation, Chicago, IL (US)

( * ) Notice: Subject to any disclaimer, the term of this patent is extended or adjusted under 35 U.S.C. 154(b) by 25 days.

(21) Appl. No.: 12/490,079

(22) Filed: Jun. 23, 2009

(65) Prior Publication Data

US 2010/0325285 A1     Dec. 23, 2010

(51) Int. Cl.
 *G06F 15/16*    (2006.01)
(52) U.S. Cl. ........................................ 709/227; 709/228
(58) Field of Classification Search ............... 709/227, 709/228
 See application file for complete search history.

(56) References Cited

U.S. PATENT DOCUMENTS

| 7,231,452 | B2 | 6/2007 | Ananda et al. |
| 7,391,768 | B1 | 6/2008 | Samprathi et al. |
| 2004/0004940 | A1* | 1/2004 | Abrol et al. .................... 370/252 |
| 2006/0165093 | A1 | 7/2006 | Borella et al. |
| 2006/0259641 | A1 | 11/2006 | Kim et al. |
| 2007/0136601 | A1 | 6/2007 | Kwon et al. |
| 2007/0198735 | A1 | 8/2007 | Kim et al. |

OTHER PUBLICATIONS

McGregor, Internet Engineering Task Force (IETF), "The PPP Internet Protocol Control Protocol (IPCP)," RFC 1332, May 1992, obtained from the Internet on Jun. 9, 2009 at http://www.ietf.org/rfc/rfc1332.txt (14 pages).
Internet Engineering Task Force (IETF), "The Point-to-Point Protocol (PPP)," RFC 1661, Jul. 1994, obtained from the Internet on Jun. 9, 2009 at http://www.ietf.org/rfc/rfc1661.txt (50 pages).
Haskin et al., The Internet Society, "RFC2472—IP Version 6 over PPP," RFC 2472, Dec. 1998, obtained from the Internet on Jun. 9, 2009 at http://www.faqs.org/rfcs/rfc2472.html (11 pages).
Nordmark et al., The Internet Society, "Basic Transition Mechanisms for IPv6 Hosts and Routers," RFC 4213, Oct. 2005, obtained from the Internet on May 4, 2009 at http://www.ietf.org/rfc/rfc4213.txt (27 pages).

* cited by examiner

*Primary Examiner* — Ario Etienne
*Assistant Examiner* — Hee Kim
(74) *Attorney, Agent, or Firm* — Leydig, Voit & Mayer, Ltd.

(57) ABSTRACT

Embodiments of the invention are used to provide a system and method for tearing down and reclaiming an IP address from a multi-IP stack device based on configurable timer parameters that provide a network operator with independent control over each protocol-specific IP network layer session. Dedicated idle and session timers for each IP network layer session are implemented at the network layer of various network nodes in order to independently tear down IPv4 and IPv6 network sessions while maintaining the underlying link layer connection. In embodiments, the IP protocol-specific idle and session timers are processed by the Packet Data Serving Node (PDSN) or the Home Agent (HA). To achieve user session level control of IP protocol-specific network layer sessions, embodiments of the invention provide for storing the network layer idle and session timer attributes at the Authentication, Authorization and Accounting (AAA) server prior to passing such attributes to the PDSN or the HA for processing during the dual-stack communication session.

24 Claims, 5 Drawing Sheets

SYSTEM AND METHOD FOR TEARING DOWN INDIVIDUAL IP COMMUNICATION SESSIONS IN MULTIPLE IP STACK DEVICES

FIELD OF THE INVENTION

This invention relates generally to the field of wireless communications and more specifically to enhanced communication session management for systems and devices capable of supporting multiple Internet Protocol (IP) stacks.

BACKGROUND OF THE INVENTION

The push towards Internet Protocol version six (IPv6) is largely due to IP address space exhaustion associated with legacy Internet Protocol version 4 (IPv4) networks. In an ideal world, a transition from IPv4 to IPv6 would take place overnight, thereby resolving any IP address space issues. However, the present reality is that for a considerable period of time there will be devices and networks that will have to support both IPv4 and IPv6. During this transition period, dual stack devices that support both IPv4 and IPv6 must utilize a scarce resource—an IPv4 address. Therefore efficient utilization of IP address space in network devices supporting multiple IP stacks, including the IPv4 stack, is paramount for preventing exhaustion of limited IPv4 address space and corresponding network resources.

While attempts have been made to address IPv4 address space exhaustion, existing solutions fail to provide independent control of multi-stack IP network layer sessions. For instance, U.S. Publication No. 2006/0165093 employs a "hang time" parameter for establishing and terminating IPv4 and IPv6 network layer sessions in dual-stack devices for purposes of sharing the link layer resources between the two sessions and to provide detailed accounting functionality. However, the "hang time" parameter does not allow independent control of each network layer session because it is not dedicated to a particular version of the IP stack. Furthermore, activation of the "hang time" parameter happens upon termination of one of the network layer sessions.

U.S. Publication No. 2007/0136601 deals with the problem of IPv4 address space exhaustion using an entirely different approach, which entails requiring user input to authenticate a request to assign an IPv4 address to an IPv6 node, rather than providing independent control of each network layer session.

BRIEF SUMMARY OF THE INVENTION

Embodiments of the invention are used to provide a system and method for tearing down and reclaiming an IP address from a multi-IP stack device based on configurable timer parameters that provide a network operator with independent control over each protocol-specific IP network layer session. Dedicated idle and session timers for each IP network layer session are implemented at the network layer of various network nodes in order to independently tear down IPv4 and IPv6 network sessions while maintaining the underlying link layer connection. In embodiments, the IP protocol-specific idle and session timers reside at the Packet Data Serving Node (PDSN), the Home Agent (HA), or at the Authentication, Authorization and Accounting (AAA) server in order to provide varying granularity of control over corresponding IPv4 and IPv6 protocol-compliant network layer sessions under Mobile IP and/or Simple IP scenarios.

In one aspect of the invention, a method is provided for independently tearing down an Internet Protocol (IP) network layer session from a mobile device capable of supporting multiple IP stacks, the method comprising (a) establishing a link layer session with the multiple IP stack mobile device, the link layer session supporting at least two IP network layer sessions, each IP network layer session implemented in accordance with a distinct version of the IP stack, (b) establishing the at least two IP network layer sessions with the multiple IP stack mobile device over the link layer session, (c) maintaining at least one of a dedicated idle timer and a dedicated session timer for each IP network layer session implemented in accordance with the distinct version of the IP stack, and (d) independently tearing down at least one of the IP network layer sessions when at least one of the dedicated idle timer and the dedicated session timer corresponding to the at least one IP network layer session expires.

In another aspect of the invention, a network node is provided for independently tearing down an Internet Protocol (IP) communication session from a mobile device capable of supporting multiple IP stacks, the network node comprising (a) a link layer for establishing a link layer session with the multiple IP stack mobile device, the link layer session supporting at least two IP network layer sessions, each IP network layer session implemented in accordance with a distinct version of the IP stack, and (b) a network layer for establishing the at least two IP network layer sessions with the multiple IP stack mobile device over the link layer session, the network layer maintaining at least one of a dedicated idle timer and a dedicated session timer for each IP network layer session implemented in accordance with the distinct version of the IP stack, wherein the network node independently tears down at least one of the IP network layer sessions when at least one of the dedicated idle timer and the dedicated session timer corresponding to the at least one IP network layer session expires.

In yet another aspect of the invention, a system is provided for independently tearing down an Internet Protocol (IP) communication session, the system comprising (a) a mobile device capable of supporting multiple IP stacks, and (b) a network node for establishing a link layer session with the multiple IP stack mobile device, the link layer session supporting at least two IP network layer sessions, each IP network layer session implemented in accordance with a distinct version of the IP stack, the network node maintaining at least one of a dedicated idle timer and a dedicated session timer for each IP network layer session implemented in accordance with the distinct version of the IP stack, wherein the network node independently tears down at least one of the IP network layer sessions when at least one of the dedicated idle timer and the dedicated session timer corresponding to the at least one IP network layer session expires.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The following examples further illustrate the invention but, of course, should not be construed as in any way limiting its scope.

Figure 1:
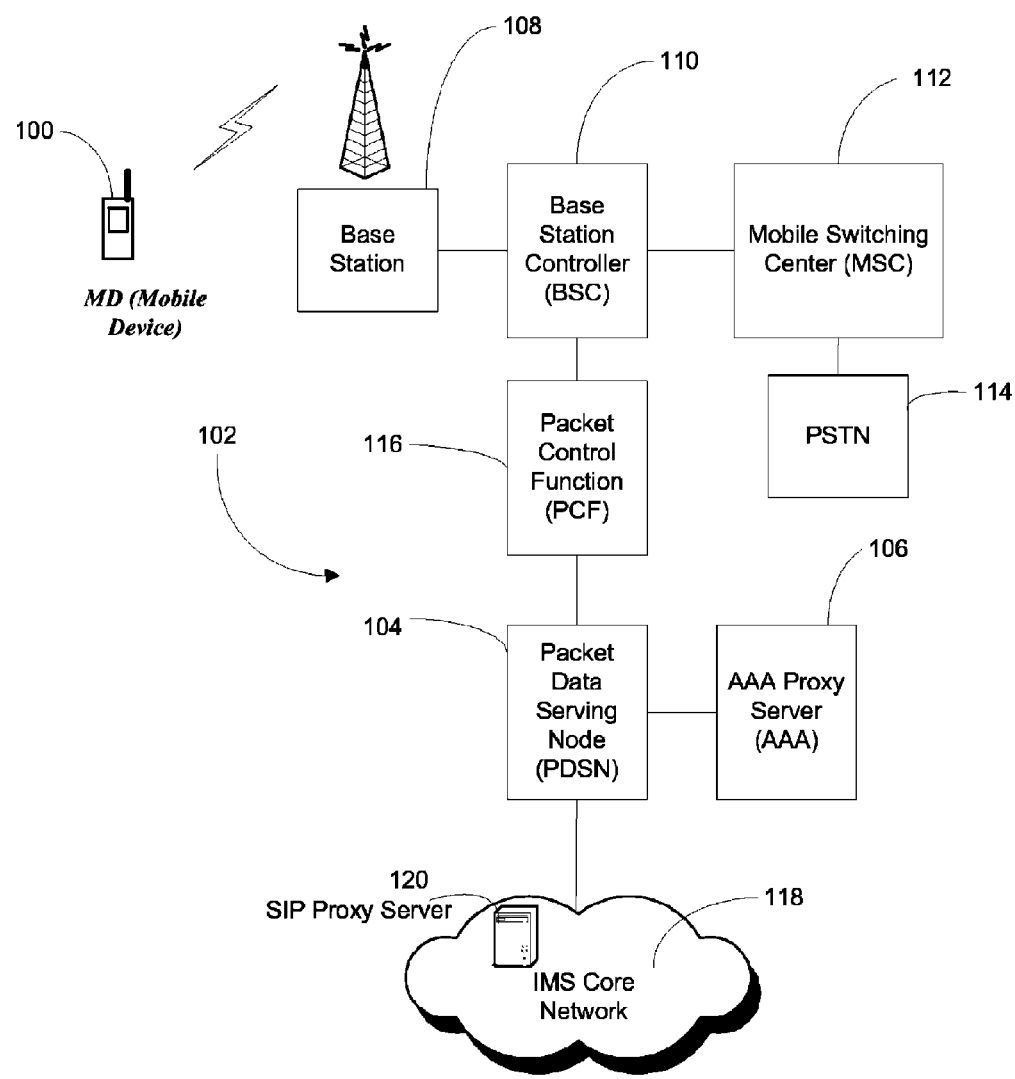
FIG. 1 is a schematic diagram illustrating an Internet Protocol (IP) multimedia mobile network environment, in accordance with an embodiment of the invention.

Turning to FIG. 1, an implementation of a system contemplated by an embodiment of the invention is shown with reference to an Internet Protocol (IP) multimedia mobile network environment. In the illustrated embodiment, the mobile device 100 supports multiple IP stacks for compatibility with networks operating in accordance with different versions of the Internet Protocol. Preferably, the mobile device 100 is a dual IP stack (dual stack) device that supports communication sessions complying with Internet Protocol version 4 (IPv4) and Internet Protocol version 6 (IPv6) in order to provide compatibility with a mobile network 102 that supports both legacy IPv4 mobile devices, as well as those that operate using an IPv6 stack at the network layer. In embodiments, the mobile device 100 is a mobile telephone, a laptop computer or a Personal Digital Assistant (PDA) having mobile network access capability, or the like. Advantageously, the network 102 conserves available IP address space by independently tearing down each IP stack and reclaiming the corresponding IP address back from the mobile device 100 by way of separately tearing down IPv4 and IPv6 network layer sessions, while maintaining the underlying link layer connection with the mobile device 100. Preferably, the network 102 implements idle and/or session timers for each individual network layer session by associating such timers with the network layer, while maintaining the underlying link layer connection. This affords a fine degree of control over the utilization of available IP address space associated with each supported version of the IP protocol. As discussed in further detail below, depending on the desired degree of granularity of management of the IP stack address space consumed by the mobile devices within the network 102, the network layer idle and/or session timers are stored at various nodes of the network 102, such as at the Packet Data Serving Node (PDSN) 104, the Home Agent, or at the Authentication, Authorization and Accounting (AAA) server 106. When the AAA server 106 is used to store the network layer idle and session timer attributes (e.g., to provide IP version-specific network layer control on user session basis), the AAA server 106 passes these attributes to the PDSN 104 (or to the Home Agent in case of Mobile IP) for processing during the multi-stack communication session with the mobile device. As further discussed below, association of individual idle and/or session timers with each network layer session conducted by the mobile device 100 and separation of such timers from the underlying link layer connection to the network 102 allows a high degree of control over communication session management in dual-stack devices, including customized session duration and associated IP address utilization management.

As illustrated in FIG. 1, the network 102 comprises a plurality of base stations 108, controlled by at least one base station controller (BSC) 110 that communicates with a Mobile Switching Center (MSC) 112 for relaying voice communications to and from the Public Switched Telephone Network (PSTN) 114. The PDSN 104 relays the network-level packet data to the BSC 110 via the Packet Control Function (PCF) 116. In a multi-PDSN network, the PCF 116 is responsible for routing the packet data to and from the appropriate PDSN, In this embodiment, PCF 116 is shown separately, however those skilled in the art will realize that the PCF may be collocated with and/or implemented as part of the BSC 110. The accounting authentication authorization (AAA) server 106 ensures that a particular subscriber associated with the mobile device 100 is allowed to use the data resources of the home network 102. The AAA server 106 communicates with the PDSN 104 via the RADIUS protocol. Upon completion of the user authorization process for the use of data resources, the AAA server 106 forwards the mobile device's IP address to the PDSN 104 for relaying it to the mobile device 100. In one embodiment, the network 102 utilizes a CDMA 2000 air interface. However, those skilled in the art will realize that the network 102 may also utilize GSM, UMTS, W-CDMA, or LTE air interfaces, to name a few. To provide IP-based multimedia services based on the Session Initiation Protocol (SIP), PDSN 104 interfaces with an IP Multimedia Subsystem (IMS) core network 118 via the SIP proxy server 120.

Figure 2:
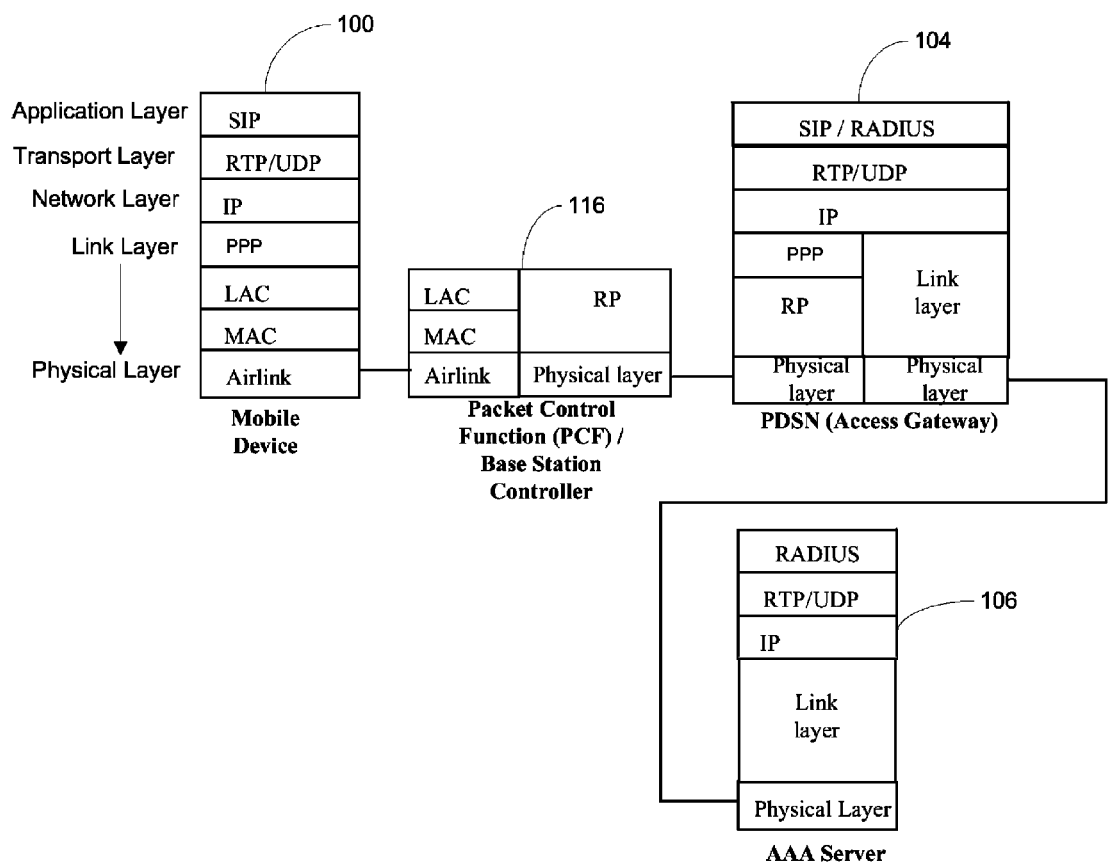
FIG. 2 is a schematic diagram illustrating a protocol model of the data nodes of the mobile network of FIG. 1, in accordance with an embodiment of the invention.

Turning to FIG. 2, an embodiment of a protocol model of the data nodes of the mobile network 102 complying with the CDMA 2000 air interface is shown. In the illustrated protocol model, call control is performed via the Session Initiation Protocol (SIP), while the media streams are conveyed over the Real Time Protocol (RTP) and User Datagram Protocol (UDP) at the transport layer, as well as the Internet Protocol (IP) at the network layer. In the illustrated embodiment, the mobile device 100, as well as the PDSN 104 and AAA server 106, supports multiple IP stacks. Preferably, the mobile device 100 is a dual stack device capable of initiating dual network layer communication sessions over a single underlying link layer connection. Most preferably, the mobile device 100 supports IPv4 and IPv6 network layer connections.

At the link layer, the mobile device 100 communicates with the PDSN 104 via the point-to-point protocol (PPP), and with the PCF 116 via the link access control (LAC) and medium access control (MAC) protocols. At the physical layer, the mobile device 100 communicates with the PCF 116 through the base station 108 and BSC 110 via an air-interface, such as the CDMA 2000 protocol. Finally, the PDSN 104 communicates with the AAA server 106 via the RADIUS/RTP/UDP/IP (over Ethernet) protocol stack.

Figure 3:
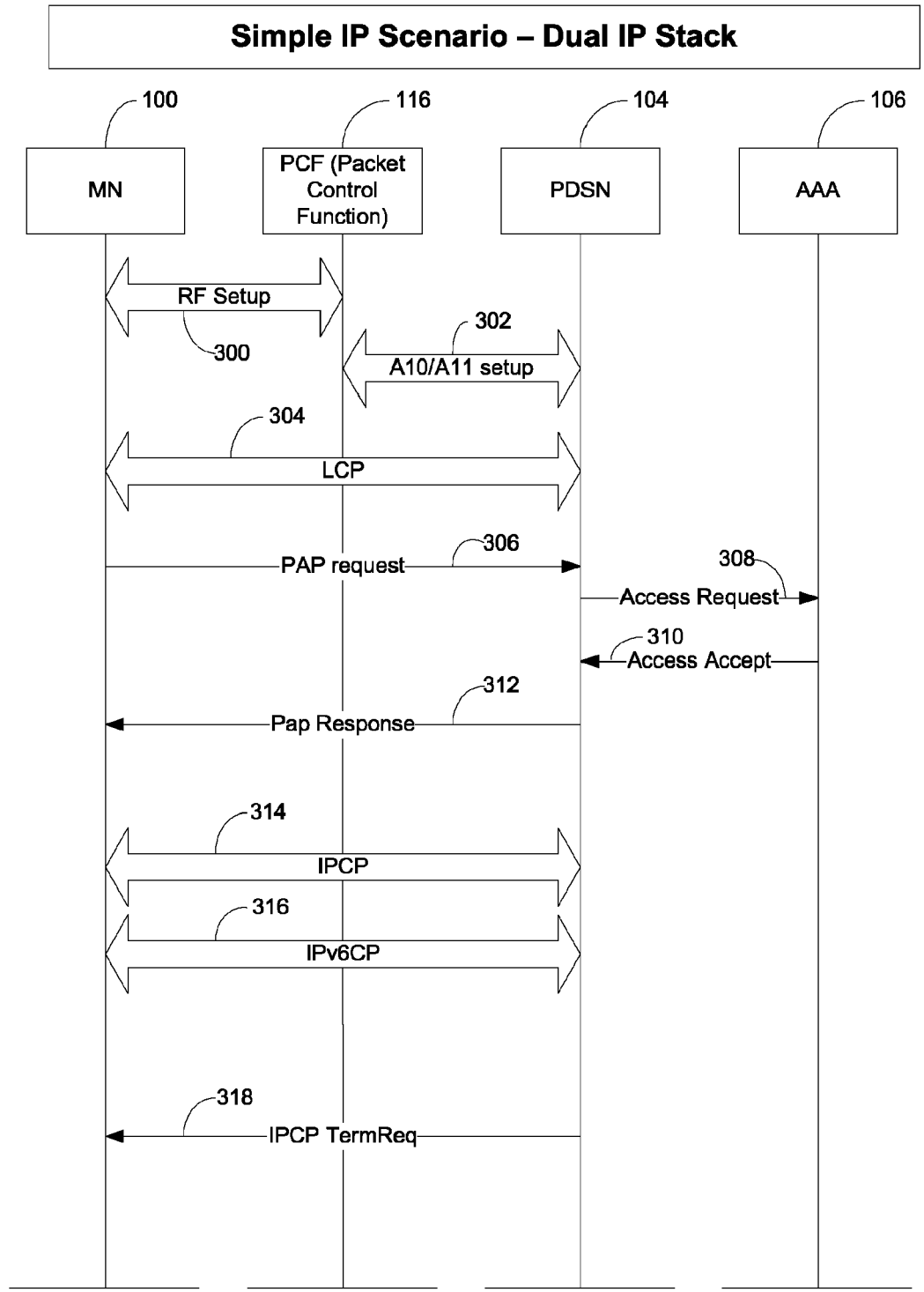
FIG. 3 is a flow diagram illustrating a message flow for setting up a dual IP stack communication session and independently tearing down Simple IPv4 and Simple IPv6 network layer sessions in a dual-stack mobile device of FIG. 1, in accordance with an embodiment of the invention.

Turning to FIG. 3, an embodiment of a message flow for setting up a dual IP stack communication session and independently tearing down Simple IPv4 and Simple IPv6 network layer sessions in a dual-stack mobile device is shown. In step 300, the mobile device 100 undergoes an RF setup procedure for setting up the physical layer link to the PCF 116 by communicating with one or more base stations 108 and BSC 110. In step 302, the PCF 116 connects with the PDSN 104 by setting up an RP (RAN-to-PDSN) protocol session via exchanging A10/A11 interface messaging for completing the RF session setup at the PDSN. Once the RP protocol connection between the PCF 116 and PDSN 104 is setup, the mobile device 100 begins to establish the link layer connections by exchanging Link Control Protocol (LCP) messaging with PDSN 104, step 304. The LCP messaging is part of the Point-to-Point Protocol (PPP) setup. Next, in step 306, the mobile device 100 undergoes an authentication procedure at the PDSN 104 and AAA server 106 by sending a Password Authentication Protocol (PAP) request to PDSN 104. In response to receiving the PAP request, PDSN 104 forwards an access request to the AAA server 106, receives an access accept message, and forwards a PAP response to the mobile device, steps 308-312. Additional embodiments include employing Challenge Handshake Authentication Protocol (CHAP) or Extensible Authentication Protocol (EAP).

Once the point-to-point link layer connection is established, the mobile device 100 establishes an IPv4 network layer connection (e.g., for supporting a web browsing application), as well as an IPv6 network layer connection (e.g., for supporting a Voice-over-IP application), over the underlying PPP link layer connection. Specifically, in steps 314-316, the mobile device 100 exchanges Internet Protocol Control Protocol (IPCP) and Internet Protocol v6 Control Protocol (IPv6CP) messaging with the PDSN 104 for maintaining the IPv4 and IPv6 network layer sessions, respectively.

To provide individual control over IP address utilization and network layer session management in dual stack devices, session and idle timers corresponding to each protocol version of the IP network layer session are provided. In the illustrated embodiment, an access gateway, such as the PDSN 104, stores and processes idle and session timer parameters (e.g., session expiration time in seconds) corresponding to each of the IPv4 and IPv6 network layer sessions, which provides network level control of IP protocol-specific address utilization. Alternatively, the AAA server 106 is configured to store dedicated session and idle timers for each of the IPv4 and IPv6 network layer sessions in order to provide control of IPv4 address allocation on user and/or global network levels, as desired. In this case, the AAA server 106 sends specific idle and session timer attributes to the PDSN 104, via an access accept message communicated during the link layer authentication phase, for further processing (step 310). In the illustrated embodiment, the PDSN 104 issues an IPCP termination request when either the session or idle timer parameters corresponding to the IPv4 network layer session indicate that the session has timed out, step 318. When the mobile device 100 receives the IPCP termination request, it terminates the IPv4 network layer session, while maintaining the IPv6 network layer session and the underlying PPP link layer connection. Optionally, if the PDSN 104 determines that either the session or idle timers corresponding to the IPv6 network layer session have expired, it issues an IPv6CP termination request to bring down the IPv6 network layer session. In another embodiment, the IPv6 network layer session is maintained as an always-on connection, for example to support a Voice-over-IP application, while the IPv4 network layer session (e.g., supporting a web browsing application subject to user idle times) is independently terminated via the idle and session timer parameters corresponding to the IPv4 network layer. This provides an efficient utilization of scarce IPv4 address space, while maintaining support of always-on services. Those skilled in the art will realize, however, that various alternate configurations are possible wherein individual network layer sessions corresponding to a particular version of the IP protocol are maintained subject to various durations of corresponding idle and session timers in order to suit specific network needs.

Figure 3A:
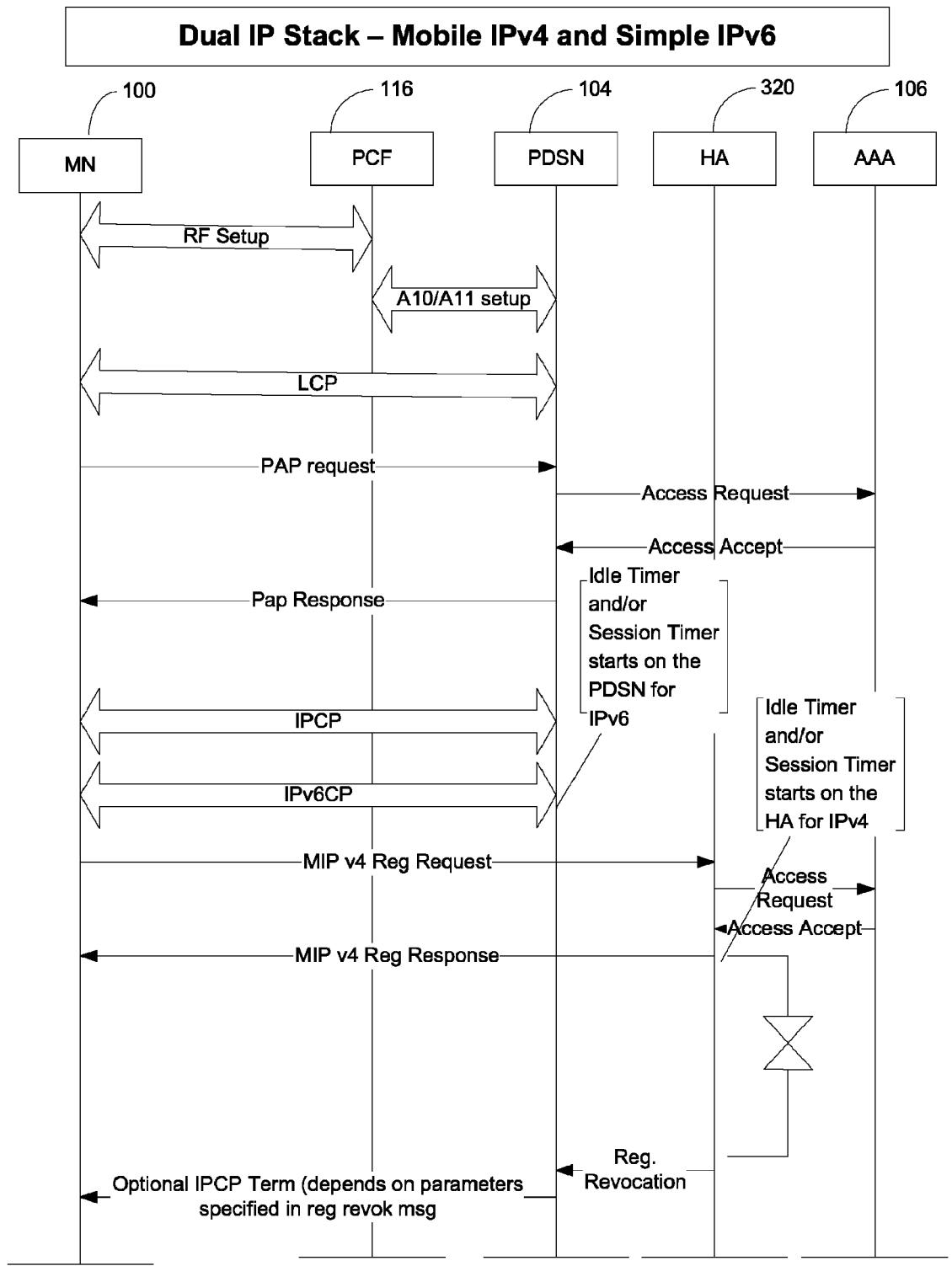
FIG. 3A is a flow diagram illustrating an embodiment of a message flow of for setting up a dual IP stack communication session and independently tearing down Mobile IPv4 and Simple IPv6 network layer sessions in a dual-stack mobile device of FIG. 1.

The teachings described herein also apply to Mobile IP, as well as mixed Mobile IP and Simple IP scenarios, wherein the foregoing session and idle timer functionality is implemented at the PDSN 104 and/or at the Home Agent (HA) 320, as shown in more detail in FIG. 3A. For instance, in case of Mobile IPv4 and Simple IPv6 network layer sessions, the idle and session timer processing occurs at the PDSN 104 for Simple IPv6 and at the Home Agent (HA) 320 for Mobile IPv4. As shown in FIG. 3A, Mobile IPv4 session and idle timers are initiated at the HA 320 upon setting up the Mobile IPv4 network layer session (HA 320 transmits Mobile IPv4 Registration Response to mobile device 100), while the Mobile IPv4 network layer session is independently terminated when the HA 320 sends a Registration Revocation to the PDSN 104 upon expiration of one of the Mobile IPv4 timers. Those skilled in the art will realize that, in accordance with the teachings described herein, various other embodiments for independently controlling IPv4 and IPv6 network layer sessions in Mobile IP and Simple IP scenarios are possible.

Figure 4:
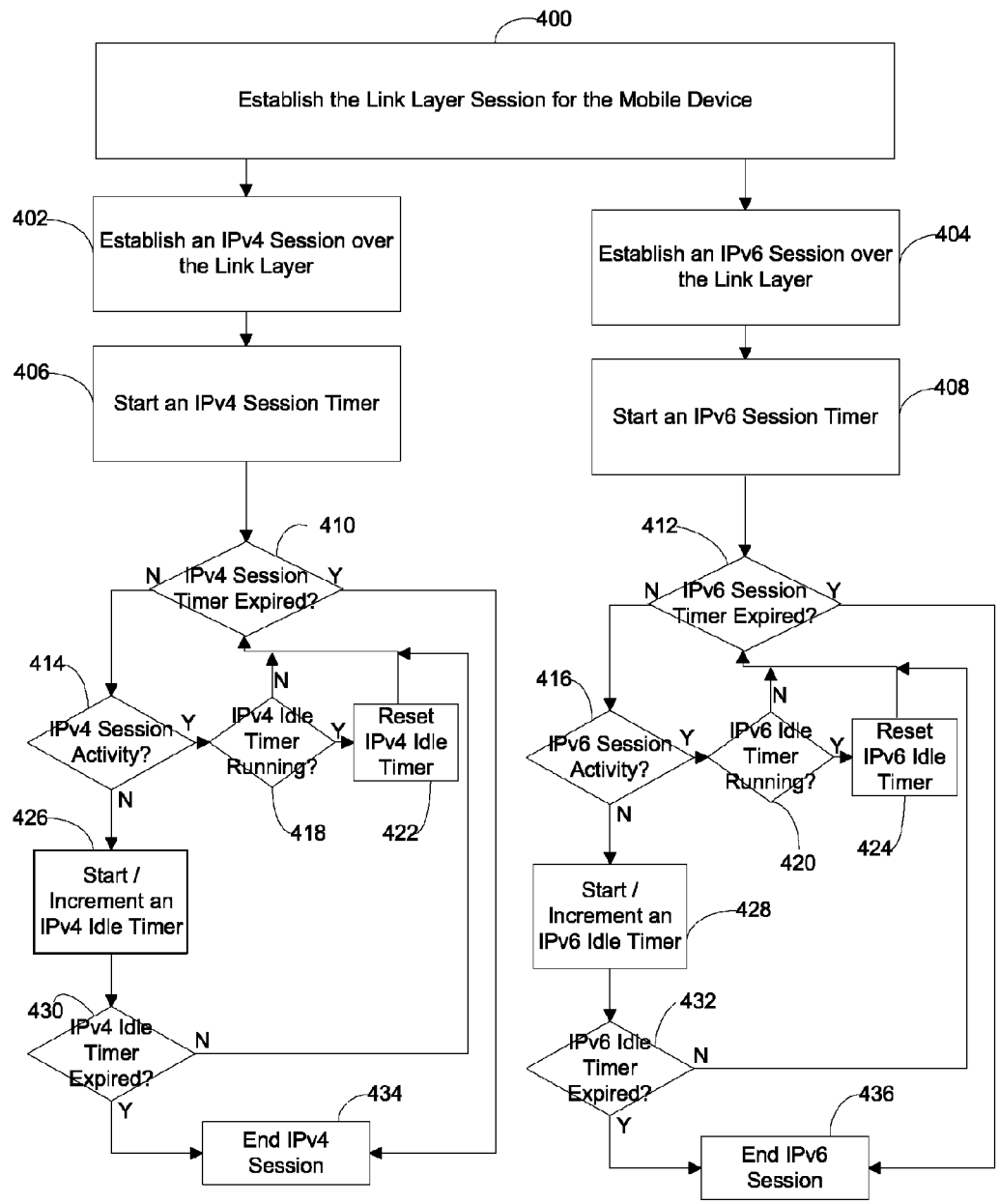
FIG. 4 is a flow chart of a method for independently tearing down IP protocol-specific network layer sessions in a dual-stack mobile device of FIG. 1, in accordance with an embodiment of the invention.

Turning to FIG. 4, an embodiment of a method for independently tearing down IP protocol-specific network layer sessions in a dual-stack mobile device is shown. In step 400, the PDSN 104 establishes a link layer session via the messaging described in FIG. 3 above. Next, the PDSN 104 separately establishes in IPv4 and IPv6 network layer sessions with the mobile device 100, steps 402-404. When each network layer session has been established, the PDSN 104 begins to independently monitor IPv4 and IPv6 network layer sessions by initiating an IP protocol-specific session timer for the corresponding network layer session (i.e., an IPv4 session timer in step 406 and an IPv6 session timer in step 408).

With respect to the IPv4 network layer session and idle timer management, the PDSN 104 checks whether the IPv4 session timer has expired and, if so, ends the IPv4 network layer session while maintaining the underlying link layer connection, including the IPv6 network layer session if it has been initiated, steps 410, 434. If the IPv4 session timer has not expired, the PDSN 104 checks whether there is an indication that the IPv4 session is active, step 414. If there is no indication of IPv4 network layer session activity (e.g., a web browsing application has not requested data for a predetermined period of time), the PDSN 104 starts a dedicated IPv4 idle timer (or increments the idle timer if it is already running), step 426. If IPv4 network layer session activity is detected by the PDSN 104, it checks whether the IPv4 idle timer is running and, if so, resets the IPv4 idle timer prior to returning to step 410, steps 418-422. In case of the IPv4 network layer session being inactive, the PDSN 104 checks whether the IPv4 idle timer has expired and, if so, ends the IPv4 network layer session while maintaining the underlying link layer connection, including the IPv6 network layer session if it has been initiated, steps 430, 434. If the IPv4 idle timer has not expired, the method returns to step 410. As discussed above, independent management of IPv4 and IPv6 network layer sessions via dedicated idle and session timers provides flexibility with respect to IP address and corresponding network resource utilization for communication sessions complying with individual network layer protocols by independently reclaiming IP protocol-specific network addresses from the mobile device. In case of scarcely available IPv4 network addresses, dedicated network layer timer management described herein facilitates a network's capacity to support a greater number of legacy IPv4 devices.

With respect to the IPv6 session timer and idle timer management, the PDSN 104 independently performs processing analogous to the IPv4 network layer timer management described above. Specifically, the PDSN 104 checks whether the IPv6 session timer has expired and, if so, ends the IPv6 network layer session while maintaining the underlying link layer connection, including the IPv4 network layer session if it has been initiated, steps 412, 436. If the IPv6 session timer has not expired, the PDSN 104 checks whether there is an indication that the IPv6 session is active, step 416. If there is no indication of IPv6 network layer session activity, the PDSN 104 starts a dedicated IPv6 idle timer (or increments the idle timer if it is already running), step 428. If IPv6 network layer session activity is detected by the PDSN 104, it checks whether the IPv6 idle timer is running and, if so, resets the IPv6 idle timer prior to returning to step 412, steps 420-424. In case of the IPv6 network layer session being inactive, the PDSN 104 checks whether the IPv6 idle timer has expired and, if so, ends the IPv6 network layer session while maintaining the underlying link layer connection, including the IPv4 network layer session if it has been initiated, steps 432, 436. If the IPv6 idle timer has not expired, the method returns to step 412.

In an alternative embodiment, the PDSN 104 manages the IPv4 network layer session as described above, while maintaining the IPv6 network layer as an always-on connection (e.g., for supporting a Voice-over-IP application). In yet another embodiment, the network layer idle and session timers described in connection with FIG. 4 above are stored at the AAA server 106, which passes these parameters to the PDSN 104 for processing, in order to achieve user session level control of IP protocol-specific address and network resource utilization. Finally, those skilled in the art will realize that the teachings described herein extend to independently tearing down individual IP network layer communication sessions from multiple IP stack devices that support more than two IP stacks, such as by implementing dedicated idle and/or session network layer timers for each supported version of the IP stack.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for independently tearing down an Internet Protocol (IP) network layer session from a mobile device capable of supporting multiple IP stacks, the method comprising:
   establishing a link layer session with the multiple IP stack mobile device, the link layer session supporting at least two IP network layer sessions, each IP network layer session implemented in accordance with a distinct version of the IP stack;
   establishing the at least two IP network layer sessions with the multiple IP stack mobile device over the link layer session;
   maintaining at least one of a dedicated idle timer and a dedicated session timer for each IP network layer session implemented in accordance with the distinct version of the IP stack; and
   for each IP network layer session, independently verifying whether at least one of the dedicated idle timer and the dedicated session timer has expired so as to independently tear down at least one of the IP network layer sessions.

2. The method of claim 1 further comprising maintaining the link layer session after tearing down the at least one of the IP network layer sessions.

3. The method of claim 1 wherein the multiple IP stack mobile device supports an IP version four (IPv4) stack and an IP version six (IPv6) stack.

4. The method of claim 1 further comprising maintaining at least one remaining IP network layer session in an always-on mode.

5. The method of claim 1 further comprising releasing an IP address corresponding to the at least one torn down IP network layer session.

6. The method of claim 1 wherein one of the at least two IP network layer sessions supports an Internet web browsing application at the multiple IP stack mobile device.

7. The method of claim 1 wherein one of the at least two IP network layer sessions supports a Voice-over-IP application at the multiple IP stack mobile device.

8. The method of claim 1 wherein the multiple IP stack mobile device supports a Mobile IP network layer session.

9. The method of claim 1 wherein the multiple IP stack mobile device supports a Simple IP network layer session.

10. A network node for independently tearing down an Internet Protocol (IP) communication session from a mobile device capable of supporting multiple IP stacks, the network node comprising:
    a link layer configured to establish a link layer session with the multiple IP stack mobile device, the link layer session supporting at least two IP network layer sessions, each IP network layer session implemented in accordance with a distinct version of the IP stack; and
    a network layer configured to establish the at least two IP network layer sessions with the multiple IP stack mobile device over the link layer session, the network layer maintaining at least one of a dedicated idle timer and a dedicated session timer for each IP network layer session implemented in accordance with the distinct version of the IP stack;
    wherein the network node independently verifies, for each IP network layer session, whether at least one of the dedicated idle timer and the dedicated session timer has expired so as to independently tear down at least one of the IP network layer sessions.

11. The network node of claim 10 comprising a Packet Data Serving Node (PDSN).

12. The network node of claim 10 comprising a Home Agent (HA).

13. The network node of claim 10 wherein the link layer maintains the link layer session after the network node tears down the at least one of the IP network layer sessions.

14. The network node of claim 10 wherein the mobile device supports an IP version four (IPv4) stack and an IP version six (IPv6) stack.

15. The network node of claim 10 wherein the network layer releases an IP address corresponding to the at least one torn down IP network layer session.

16. A system for independently tearing down an Internet Protocol (IP) communication session, the system comprising:
a mobile device capable of supporting multiple IP stacks; and
a network node for establishing a link layer session with the multiple IP stack mobile device, the link layer session supporting at least two IP network layer sessions, each IP network layer session implemented in accordance with a distinct version of the IP stack, the network node maintaining at least one of a dedicated idle timer and a dedicated session timer for each IP network layer session implemented in accordance with the distinct version of the IP stack;
wherein the network node independently verifies, for each IP network layer session, whether at least one of the dedicated idle timer and the dedicated session timer has expired so as to independently tear down at least one of the IP network layer sessions.

17. The system of claim 16 wherein the network node comprises a Packet Data Serving Node (PDSN).

18. The system of claim 16 further comprising an Authentication, Authorization and Accounting (AAA) server for sending the at least one of a dedicated idle timer and a dedicated session timer attributes to the network node.

19. The system of claim 16 wherein the network node comprises a Home Agent (HA).

20. The system of claim 16 wherein the multiple IP stack mobile device supports at least one of a Simple IP network layer session and a Mobile IP network layer session.

21. The system of claim 16 wherein the network node is associated with a mobile network for providing the multiple IP stack mobile device with access to communication services.

22. The system of claim 21 wherein the mobile network is selected from the group consisting of: a CDMA 2000 network, a GSM network, an UMTS network, a W-CDMA network, and an LTE network.

23. The system of claim 16 wherein the mobile device supports an IP version four (IPv4) stack and an IP version six (IPv6) stack.

24. The system of claim 16 wherein the network node maintains the link layer session after tearing down the at least one of the IP network layer sessions.

* * * * *